United States Patent [19]

Stewart et al.

[11] Patent Number: 5,029,076
[45] Date of Patent: Jul. 2, 1991

[54] APPARATUS AND METHOD FOR PROVIDING A SETTLING TIME CYCLE FOR A SYSTEM BUS IN A DATA PROCESSING SYSTEM

[75] Inventors: Robert E. Stewart, Stow; James B. Keller, Arlington, both of Mass.

[73] Assignee: Digital Equipment Corporation, Maynard, Mass.

[21] Appl. No.: 512,571

[22] Filed: Apr. 9, 1990

Related U.S. Application Data

[63] Continuation of Ser. No. 240,456, Sep. 2, 1988, abandoned, which is a continuation of Ser. No. 823,774, Jan. 29, 1986, abandoned.

[51] Int. Cl.$^5$ .......................................... G06F 13/364
[52] U.S. Cl. ............................... 364/200; 364/242.6; 364/242.7
[58] Field of Search ... 364/200 MS File, 900 MS File

[56] References Cited

U.S. PATENT DOCUMENTS

| | | | |
|---|---|---|---|
| 3,735,365 | 5/1973 | Nakamura et al. | 364/200 |
| 3,810,114 | 5/1974 | Yamada | 364/200 |
| 3,983,540 | 9/1976 | Keller et al. | 364/200 |
| 3,995,258 | 11/1976 | Barlow | 364/200 |
| 4,067,059 | 1/1978 | Derchak | 364/200 |
| 4,085,444 | 4/1978 | Schneider | 364/900 |
| 4,186,379 | 1/1980 | Knoblock | 340/146.1 R |
| 4,229,791 | 10/1980 | Levy et al. | 364/200 |
| 4,249,093 | 2/1981 | Henig | 307/232 |
| 4,449,183 | 5/1984 | Flahive et al. | 364/200 |
| 4,453,214 | 6/1984 | Adcock | 364/200 |
| 4,493,036 | 1/1985 | Boudreau et al. | 364/200 |
| 4,536,839 | 8/1985 | Shah et al. | 364/200 |
| 4,627,018 | 12/1986 | Trost et al. | 364/900 |

OTHER PUBLICATIONS

Patent Abstracts of Japan, vol. 8, No. 129 (P-280) (1566), Jun. 15, 1984, and JP, A, 5933524 (DOI) Feb. 23, 1984.

IBM Technical Disclosure Bulletin, vol. 24, No. 10, Mar. 1982 (New York, US) Blum: "Full Use of Transfer Cycles in Computers", pp. 5188-5190, see page 5188, Figure; p. 5189, Lines 20-24.

*Primary Examiner*—David Y. Eng
*Attorney, Agent, or Firm*—Finnegan, Henderson, Farabow, Garrett and Dunner

[57] ABSTRACT

In a data processing system in which a plurality of data processing units or subsystems exchange logic signal groups by means of a system bus, apparatus is provided to allow sufficient time to permit transients on the system bus to decay, thereby increasing the integrity of the data. When the logic signal groups are applied to the system bus via conducting and nonconducting transistors, the presence of a logic signal on the system bus immediately prior to the application of a set of logic signals from a different data processing unit can delay the on-set of conduction of the most recently activated transistors, thereby resulting in transients of long duration. To accommodate these long transient conditions, the application of the new set of logic signals can be delayed until the transients on the system bus have been attenuated. Apparatus is disclosed for prohibiting access to the system bus by any subsystem during the system clock cycle following a subsystem access or by preventing access to the system bus by subsystems determined by the subsystem having access during the prior system clock cycle.

8 Claims, 5 Drawing Sheets

APPARATUS AND METHOD FOR PROVIDING A SETTLING TIME CYCLE FOR A SYSTEM BUS IN A DATA PROCESSING SYSTEM

This application is a continuation of application Ser. No. 07/240,456, filed Sept. 2, 1988 now abandoned, which is a continuation of application Ser. No. 06/823,774, filed Jan. 29, 1986 now abandoned.

BACKGROUND OF THE INVENTION

1. Field of the Invention

This invention relates generally to data processing systems and more particularly to the exchange of logic signals on a system bus in the data processing system. The exchange of logic signals by means of a system bus can compromise the integrity of the signal exchange unless provision is made to permit the transient signal conditions, resulting from the activation and deactivation of the driver circuits applying the signals to system bus, to come to equilibrium.

2. Description of the Related Art

Referring to FIG. 1, a typical data processing system is shown. The data processing system includes at least one central processing unit 10 (or 11), at least one input-/output device 13 (or 14), at least one memory unit 15 and a system bus 19 coupling the plurality of units or subsystems of the data processing system. The central processing unit processes groups of logic signals according to software and/or firmware instructions. The logic signal groups to be processed are typically stored in the memory unit 15. A console unit 12 can be coupled to the central processing unit(s) and typically includes the apparatus and stored instructions to initialize the system and can act as a terminal during the operation of the data processing system. The input/output units provide the interface to the remainder of the data processing system to terminal units, mass storage units, communication units, and any other units to be coupled to the data processing system. The detailed function of the units coupled to the system bus is less important than the fact that these units operate autonomously and communicate with the remainder of the data processing units primarily by means of the system bus.

Referring next to FIG. 2, the technique for applying logic signals to the system bus is illustrated. The system bus 19 is compromised of a multiplicity of conducting elements, 19a through 19g. The conducting elements, as the cycle times of the data processing systems have decreased, have acquired the characteristics of transmission lines and must, for example, be terminated in such manner (not shown) as to avoid reflections. Each data processing unit that can apply signals to the system has a multiplicity of transistors coupled to the system bus. For example, data processing system unit 21 has the emitter elements of transistors 21a through 21g coupled to system bus conductors 19a through 19g respectively, while data processing system unit 23 has the emitter elements of transistors 23a through 23g also coupled to conducting elements 19a through 19g. When data processing system unit 21 is to place a group of logic signals on the system bus, the base terminals of the transistors that are to assume a first logic state are maintained at a high level (in which the associated transistors are conducting), while the base elements of the transistors that are to assume a second logic state are maintained at low level (in which the associated transistors are in a nonconducting state).

It will be clear that the transient conditions on the system bus that result from a change in state of conductivity of a coupled transistor pair can remain for the length of time needed for the propagation, whichever is longer, of the signal (1) from the data processing system unit establishing the logic state of the bus to the data processing system units identifying the state of the system bus, or (2) from the unit releasing the logic state of the bus to the unit(s) identifying the state of the bus.

However, the transient conditions on the system bus can remain for a longer period of time as can be understood by reference to FIG. 3 and FIG. 4. When the initial state of the conductor 19x of the system bus is the first (high) logic state in which the transistor 21x, associated with corresponding data processing subsystem 21, is in the conducting state, the voltage level along conductor 19x is essentially constant, position 21 indicating the location on the system bus conductor of data processing system unit 21 and position 23 indicating the location on the system bus conductor of data processing system unit 23. This condition is shown by the curve in FIG. 4a. When the next consecutive state in the system is one in which transistor 21x is in a nonconducting state and transistor 23x is in a conducting state, then, immediately after the new state is entered, transistor 21x is rendered nonconducting. As shown in the curve in FIG. 4b, immediately after the new state is entered, the low voltage level indicating the application of no logic level propagates along the conducting element 19x. Turning now to the operation of the transistor 23x, the base of transistor 23x has a voltage applied thereto to place this transistor in a conducting state. However, because the signal resulting from ceasing of the prior conduction of transistor 21x has not yet propagated to the position of transistor 23x on the system bus conductor, transistor 23x may not be in the conducting state even though the voltage level of the base is at a level where conduction of the transistor normally takes place. At a later time, as shown in FIG. 4c, the effect of rendering transistor 21x nonconducting will have propagated to position 23. Immediately thereafter, as shown in FIG. 4d, transistor 23 becomes conducting and a voltage level signal is propagated along the system bus conductor. After a period of time, the voltage level resulting from initiation of conduction of transistor 23x will reach position 21, as shown in FIG. 4e. Therefore, it will be clear that transient signal effects on the system bus can persist for a longer period than the time calculated for the transients to propagate along the distance defined by the physical separation of the data processing system elements.

It has been known in the related art to provide a timing cycle for the data processing system that can accommodate the longest required time. However, the adjustment of the system timing cycle to the worst case can be inefficient because for selected types of access to the system bus, a plurality of bus access cycles can occur from a single data processing subsystem without interruption. The excessively long system cycle time would make such a transfer of signals unnecessarily long in addition to the overall compromise of the system performance resulting from a long system cycle time.

A need has therefore been felt for apparatus and method of operation for the system bus that would permit the cycle time of the data processing system to remain short while simultaneously permitting any transient conditions on the system bus to decay, thereby maintaining the integrity of logic state imposed on the data processing system bus.

SUMMARY OF THE INVENTION

It is an object of the present invention to provide an improved data processing unit.

It is a further object of the present invention to provide a data processing system that can provide for variable delays in the decay of transient conditions on the system bus.

It is a particular object of the present invention to provide a delay in the access of the system bus by a newly selected data processing subsystem that is determined by the data processing subsystem having system bus access during the prior system clock cycle.

It is a more particular object of the present invention, in a data processing system in which conduction of a first transistor coupled to a system bus can delay the conduction of a second transistor coupled to the system bus, to provide apparatus for eliminating the effect of the interaction of the two transistors without increasing the system clock cycle.

The aforementioned and other objects are accomplished, according to the present invention, by coupling the data processing subsystems to a control unit and by manipulating output signals from an arbitration unit in a manner to provide additional time prior to application of the control unit signals when predetermined conditions are present. The arbitration unit receives signals from each subsystem as the subsystem requires access to the system bus. In the event of conflict between two subsystems, the arbitration unit resolves the conflict according to an algorithm associated with a decision network device in the control unit. According to one embodiment of the present invention, associated with the arbitration unit is apparatus that permits the Request signals to be disabled for a period of time prior to the application of the Request signal to the decision network after any prior access to the system bus. According to a second embodiment of the present invention, the application of the Enable signal to a data processing subsystem determined by the decision network can be delayed for selected subsystems, the remaining subsystems receiving the Enable signal during the present clock cycle. In this embodiment, apparatus can be added to redetermine the subsystem receiving the Enable signal after a delay in the generation of the signal.

These and other features of the present invention will be understood upon reading of the following description along with the drawings.

DETAILED DESCRIPTION OF THE PREFERRED EMBODIMENT

1. Detailed Description of the Figures

FIG. 1, FIG. 2, FIG. 3 and FIG. 4 have previously been described.

Figure 1:
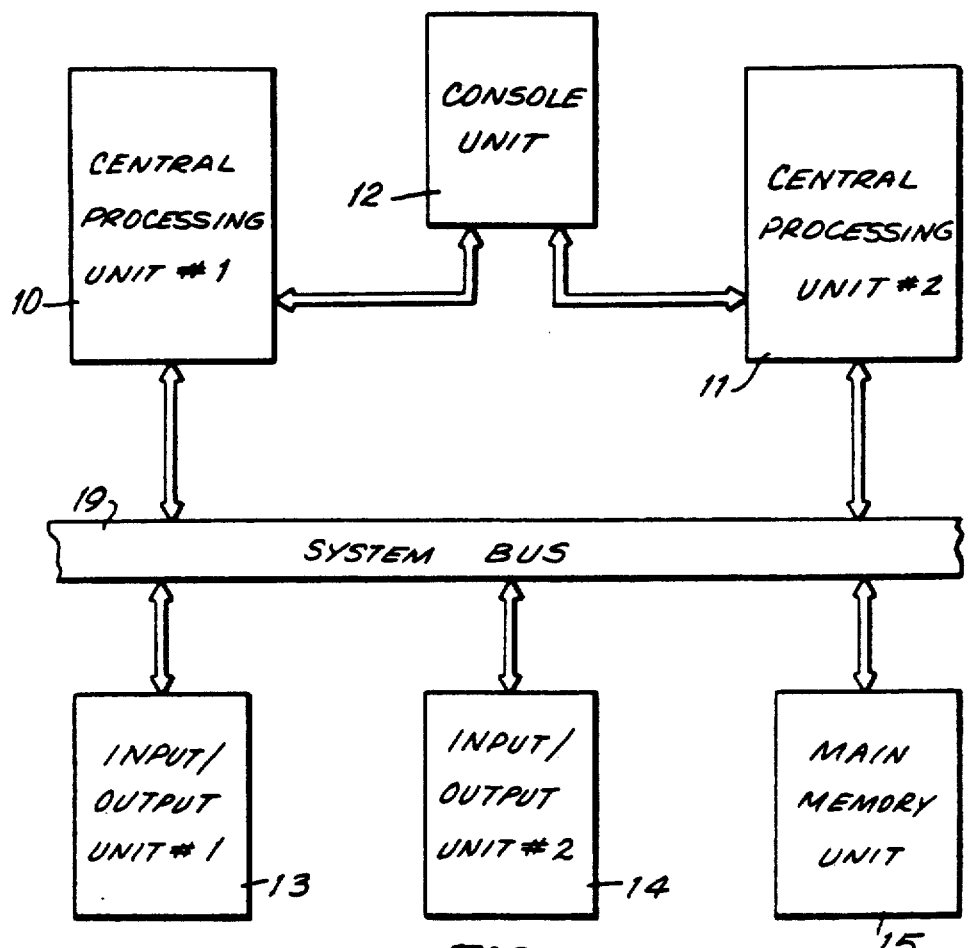
FIG. 1 is a block diagram of the components of a data processing system capable of utilizing the present invention.
Figure 2:
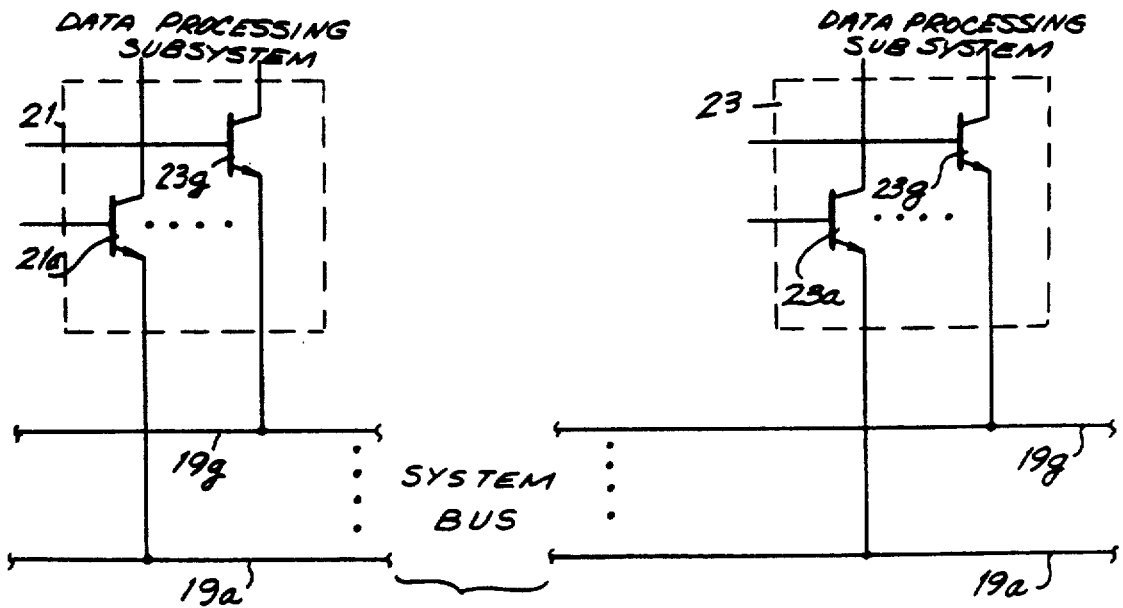
FIG. 2 is a schematic diagram of the coupling of units of the data processing system to the system bus by means of transistors.
Figure 3:
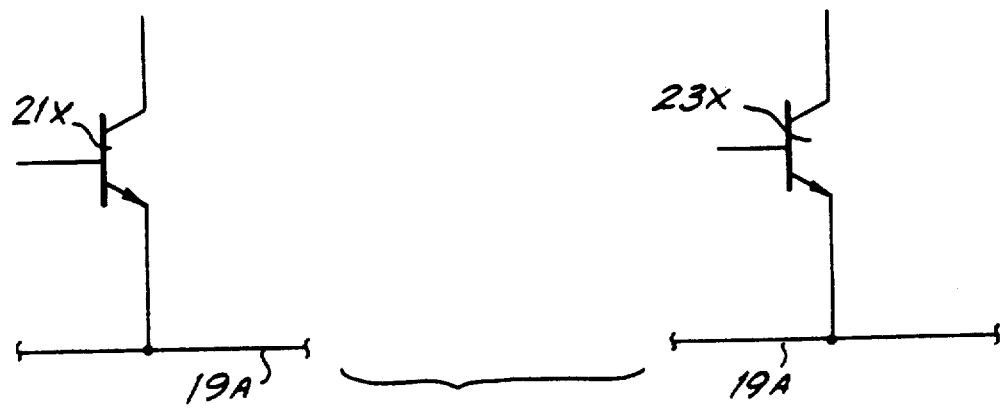
FIG. 3 is a schematic diagram of the coupling of two transistors to a conductor in the system bus.
Figure 4:
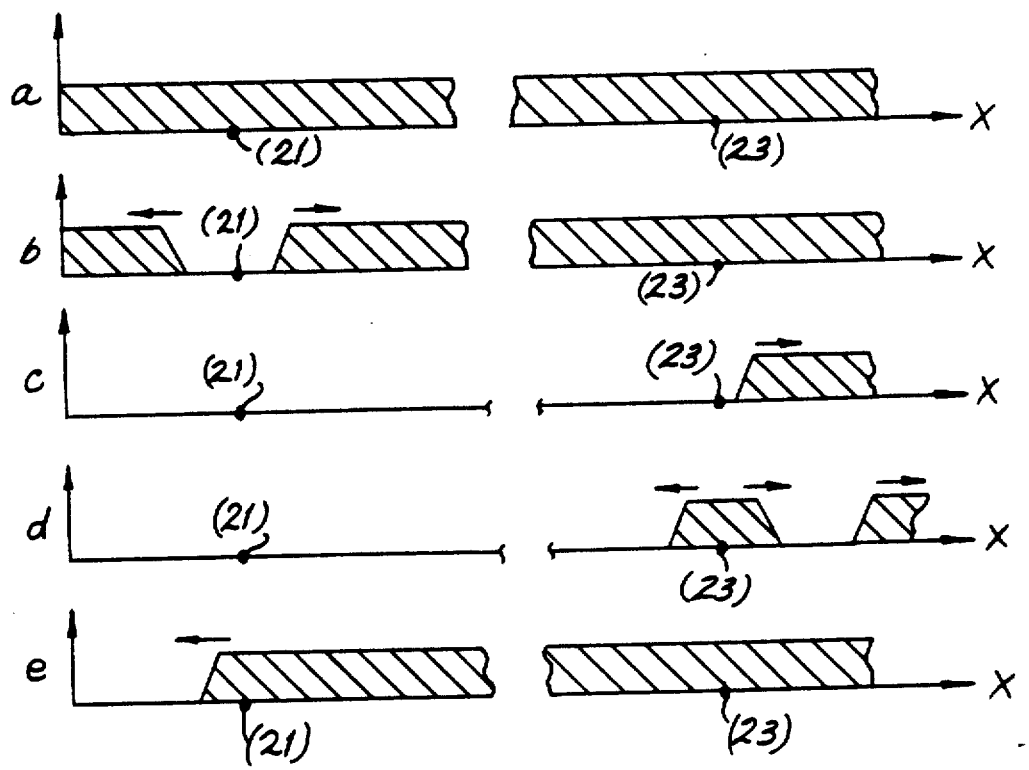
FIG. 4 is a diagrammatic representation of the signal levels on a system bus during the transition from application of a logic signal group by one data processing system unit to an application of a logic signal group by a second data processing system unit to the system bus.
Figure 5:
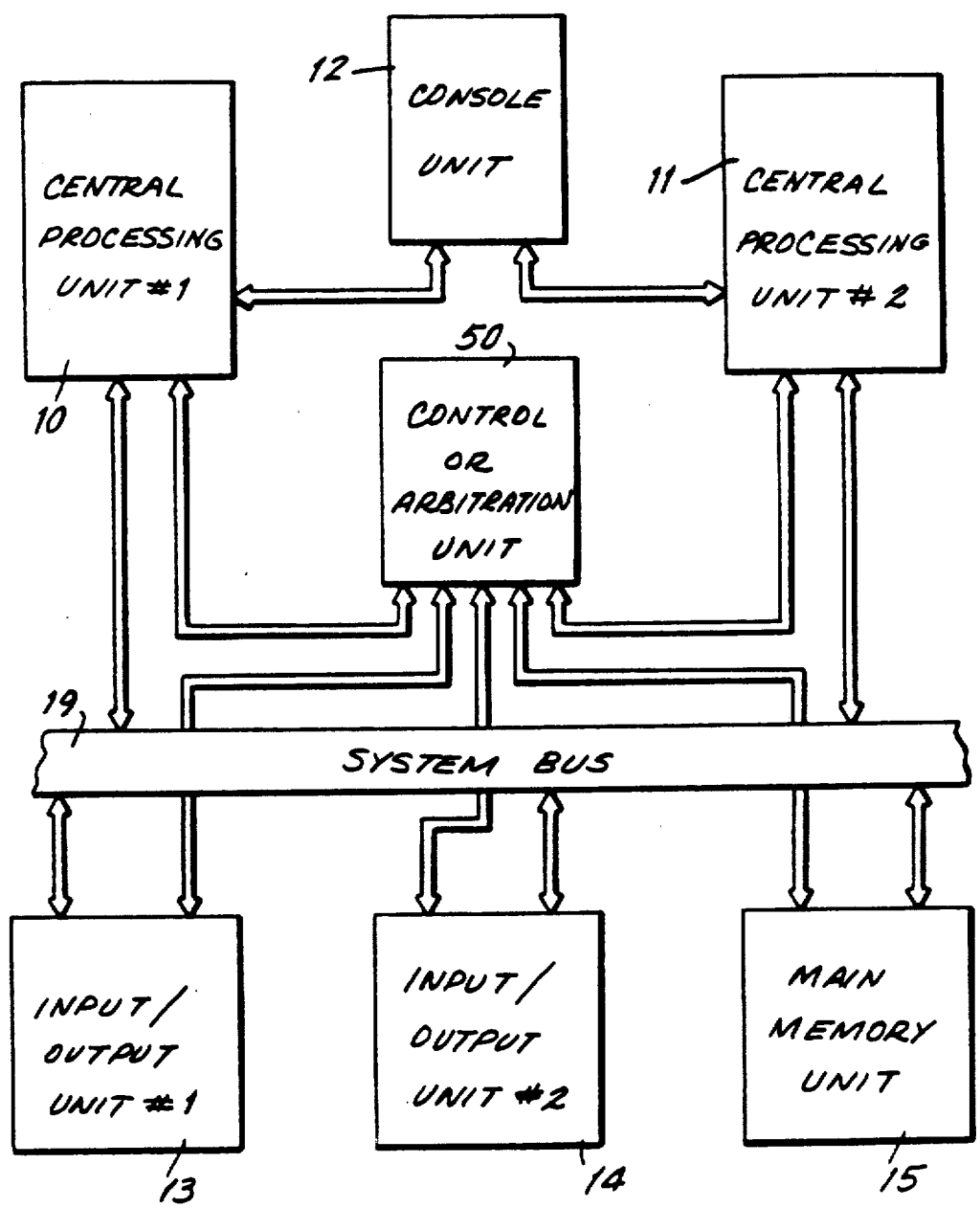
FIG. 5 is a block diagram of a data processing system having a unit to determine the next data processing subsystem to apply a logic signal group to the system bus.

Referring next to FIG. 5, the data processing system and the data processing subsystem, as shown and described with reference to FIG. 1, or illustrated. In addition, an arbitration unit 50 is indicated that can control the application of the groups of logic signals to the system bus. Such an apparatus is a control unit that can be referred to as a system bus arbitration unit, one such apparatus is described in U.S. Pat. No. 4,229,791; entitled Distributed Arbitration Circuitry for Data Processing Systems; assigned to the assignee of the present Patent Application. In the preferred embodiment, utilizing central arbitration, a centralized arbitration unit 50 operates in the following manner. When any of the subsystems has the requirement that the subsystem must place a group of logic signals on the system bus, a Request logic signal is applied to a mechanism coupling the data processing subsystem and the arbitration unit 50. In the simplest situation, the data processing subsystem and the arbitration unit 50 are coupled by a conductor, a logic signal applied thereto indicating not only the presence of a Request for access to the system bus, but also the identity of the subsystem requesting the access. Based on an algorithm preventing monopoly of the system bus by a particular subsystem, assigning priorities to the various data processing unit subsystems, and taking account of any other factor deemed important in the access to the system bus, the arbitration unit 50 determines the next data processing subsystem to have access to the system bus, and an Enable logic signal is applied to the selected subsystem by a coupling means, typically a conductor. The presence of this Enable logic signal communicates to the selected data processing subsystem that the logic signal group can be applied to the system bus. The selected subsystem can apply a Hold logic signal to the arbitration unit 50. The Hold logic signal is used in those situations where the selected data processing subsystem must apply a plurality of logic signal groups in sequence to the system bus. The Hold signal prevents the Enable signal from being removed from the selected data processing subsystem until the necessary system clock cycles have passed for the plurality of related logic signal groups to have been applied to the system bus.

Figure 6:
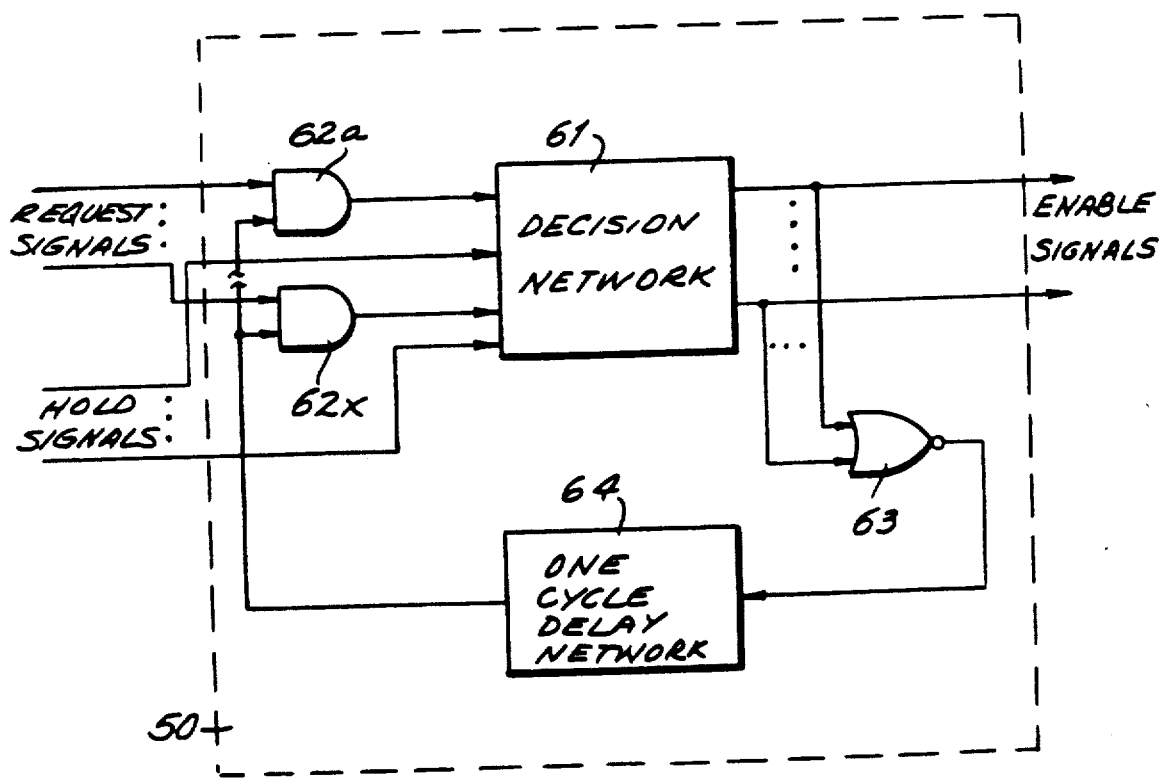
FIG. 6 is a block diagram of the apparatus for disabling the application of the logic signal group for a timing cycle.

Referring next to FIG. 6, the apparatus for preventing the application of the Enable logic signals to the selected subsystem is shown. The arbitration unit 50 can receive Request signals and Hold signals from the data processing subsystems requiring access to the system bus. The Hold signals are coupled directly to the decision network 61 at terminals associated with the particular data processing subsystem issuing the Hold signal. The Request line from each data processing subsystem is coupled to the first input terminal of a logic "AND" gate 62a through 62x associated with the data processing subsystem. The output terminals of the logic "AND" gates 62a through 62x are coupled directly to terminals of the decision network 61 associated with the Request signal line's data processing system. The output terminals of the decision network 61 are coupled to conducting paths that apply the Enable signals to the associated data processing subsystem. Each Enable line is also coupled to an input terminal of logic "NOR" gate 63. The output terminal of logic "NOR" gate 63 is coupled to an input terminal of a one cycle delay network 64, while the output terminal of one cycle delay network 64 is coupled to a second input terminal of each of the logic "AND" gates 62a to 62x.

Figure 7:
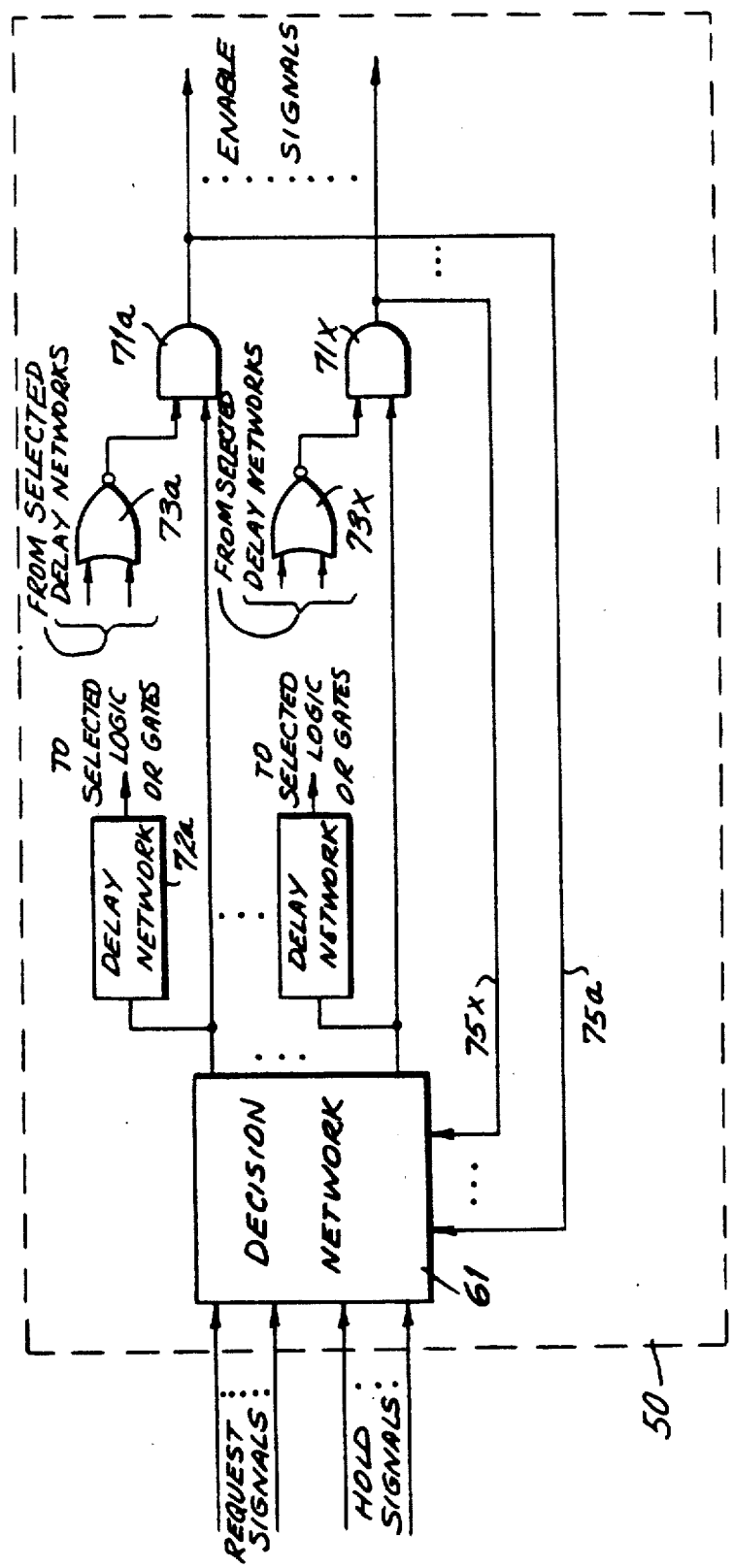
FIG. 7 is a block diagram of apparatus for controlling the delay of application of logic signal groups to the system bus determined by the particular data processing subsystem having the last access.

Referring next to FIG. 7, a block diagram is shown of apparatus for providing, to a selected data processing subsystem, an Enable signal that can be delayed when one of a group of preselected subsystems received an Enable signal during a previous timing cycle. Each output terminal of the decision network 61 is coupled to an input terminal of a delay network 72a through 72x and a first input terminal of logic "AND" gates 71a through 71x respectively. Each second input terminal of logic "AND" gates 71a through 71x is coupled to an output terminal of logic "NOR" gate 73a through 73x respectively. The output terminals of the delay networks 72a through 72x are coupled to input terminals of logic "OR" gates 71a through 71x according to the following relationship. When the two subsystems should be activated consecutively only after a delay to avoid settling time problems, the output terminals of the delay networks associated with the two subsystems should be coupled to the input terminal of the logic "OR" gate associated with the other subsystem. In this manner, the subsystems that should have a delay between accesses to the system bus are insured of an enforced delay.

2. Operation of the Preferred Embodiment

The use of the system bus in data processing systems provides flexibility in configuration of the system. Data processing subsystems can be added or removed from the system relatively easily. However, the price of this flexibility is that the time required to transfer logic signal groups from one data processing system component unit to a second is not precisely known, but can be determined only within certain limits. The present invention permits the data processing system to accommodate a long settling time for transients on the system bus. The principle of delaying the initiation of the control signal permitting access to the system bus can be used in synchronous or nonsynchronous data processing systems. In the synchronous data processing systems in which the clocking cycles are synchronized for each data processing subsystem, the activation of the system bus access control or enable signal can be delayed by one or more system clock cycles. The present invention can be used as part of an arbitration unit. The arbitration unit is employed in a data processing system to resolve conflicts between the data processing subsystems for access to the system bus and to insure that one subsystem does not monopolize the system bus. In addition, in data processing systems in which consecutive system bus accesses are provided to expedite certain signal group transfers, the arbitration unit can be responsive to the Hold signals, permitting the subsystem to maintain access for consecutive clock cycles, and delay issuance of a control signal until the consecutive access procedure has been completed.

Referring once again to FIG. 6, it will be clear that the primary operation of network 64 is the delay of the Enable signal for one cycle by preventing application of the Request signal to the decision network 61 in the first embodiment. In the embodiment shown, the delay is for one cycle, however other delay periods can be easily accommodated. Upon generation of an Enable signal, the delay network 64 delays a logic signal for one cycle and then applies a negative logic signal to the input terminal of all the logic "AND" gates 62a to 62x, thereby disabling the logic "AND" gates until one cycle after the Enable signal is removed from the output terminals of the decision network 61. When no Enable signal is applied to the output terminals of decision network 61, a positive logic signal is applied to the output terminal of logic "NOR" gate 63. One cycle later, the positive logic signal is applied, via delay network 64, to the second input terminal of the logic "AND" gates 62a through 62x and enables the logic "AND" gates. The enabled logic "AND" gates therefore can transmit the Request signals to the decision network for determining the next data processing system to have access to the system bus.

The foregoing apparatus provides a uniform (one cycle) delay after the generation of each Enable signal. However, it can be desirable, in order to increase the bus activity, to establish that, for selected data processing subsystems, the delay in access to the system bus is not required. In order to implement a arbitration unit in which a delay can or can not be required, the implementation illustrated in FIG. 7 can be used. The coupling of the delay networks 72a through 72x to the logic "OR" gates 73a through 73x in the manner described previously delays the Enable signal from passing through the associated logic "AND" gate when one of the terminals associated with a preselected subsystem has been activated during the previous timing cycle. The Enable signal is fed back via its associated line 75a through 75x in order to communicate to decision network 61 that the Enable signal issued. With this information, network 61 may update its priority state.

The apparatus for delaying the application of the Enable signal to compensate for system bus settling times can either be performed on the incoming Request signals or on the Enable signals themselves. When the delay is imposed on the Enable signals and when decision network 61 makes priority decisions based upon previous bus access success, the actual transmission of the Enable signal must be communicated to the decision network.

In the interaction by data processing subsystems with the system bus, one mode of operation results in a plurality of signal groups being applied to the system bus on consecutive cycles. The apparatus of the present invention is intended to provide a delay only when the subsystem having access to the bus changes. For a multiplicity of signal groups applied by a given subsystem to the system bus on consecutive clock cycles, only the first signal group is delayed.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. The method of controlling the application of logic signal groups from data processing units of a data processing system having a central arbitration unit to a system bus comprising the steps of:
   determining, by said central arbitration unit, a determined one of said data processing units to be granted access to said system bus in order to apply a logic signal group to said system bus;
   generating, by said central arbitration unit, enabling signals to enable data processing units receiving enabling signals to gain access to said system bus;
   applying an enabling signal to said determined one of said data processing units enabling it to gain access to said system bus; and
   preventing the central arbitration unit from repeating the step of generating enabling signals during a system clock cycle immediately following said determined one of said data processing units gaining access to said system bus, thereby inhibiting other of said data processing units, than said determined one of said data processing units, from gaining access to said system bus during said system clock following said determined one of said data processing units gaining access to said system bus.

2. The method for controlling the application of logic signals to a system bus according to claim 1 further comprising the steps of coupling said data processing units to said system bus with transistors and using conductive states of a plurality of transistors to establish logic states generated by said data processing units on said system bus.

3. A data processing system, comprising:
   a system bus for carrying transmitted logic signal groups having a transient time period equal to the time for said logic signal groups transmitted on said system bus to stabilize;
   a first data processing unit and a second data processing unit coupled to said system bus, each of said first and second data processing units including:
   means for transmitting logic signal groups on said system bus, and;
   means for generating bus request signals;
   central arbitration means coupled to said first and second data processing units for permitting said first and second data processing units to successively gain access to said system bus including:
   decision means for determining the order in which said first and second data processing units are permitted to gain access to said system bus in succession in response to said bus request signals and for generating one of a first enable signal and a second enable signal corresponding to said first and second data processing units respectively;
   means for generating an inhibit signal in response to generation of one of said first and second enable signals, said inhibit signal generation means generating said inhibit signal after generation of said one of said first and second enable signals for a period of time at least equal to the transient time period for logic signal groups transmitted by the preceding data processing unit permitted to gain successive access to the system bus; and
   means for inhibiting the transmission of successive bus request signals to said decision means for said period of time in response to an inhibit signal.

4. The data processing system for controlling the transfer of logic signal groups of claim 1 wherein the means for transmitting logic signal groups on the system bus includes a plurality of transistors coupled to the system bus, and wherein said data processing units establish the logic signal groups applied to the system bus by conduction or nonconduction of the transistors coupled to said system bus.

5. A data processing system according to claim 3 wherein said means for generating an inhibit signal includes a delay network.

6. A data processing system, comprising:
   a system bus for carrying transmitted logic signal groups having a transient time period equal to the time for said logic signal groups transmitted on said system bus to stabilize;
   a first data processing unit and a second data processing unit coupled to said system bus, each of said first and second data processing units including:
   means for transmitting logic signal groups on said system bus, and
   means for generating bus request signals;
   central arbitration means coupled to said first and second data processing units for permitting said first and second data processing units to successively gain access to said system bus including:
   decision means for determining which of said first and second data processing units is permitted to gain access to said system bus in succession in response to said bus request signals and for generating one of a first enable signal and a second enable signal corresponding to said first and second data processing units respectively;
   means for generating delayed first and second enable signals corresponding respectively to said first and second enable signals, said delayed first and second enable signals having a duration of time at least equal to the transient time period for logic signal groups transmitted by the preceding data processing unit permitted to gain successive access to the system bus; and
   means for disabling said decision means and inhibiting successive transmission of a selected one of said first enable signal for said duration of time in response to the presence of a selected one of said delayed first and second enable signals, respectively.

7. The data processing system of claim 6 wherein said data processing units are coupled to said system bus by transistors.

8. A data processing system according to claim 6 including a plurality of data processing units and a plurality of corresponding first and second enable signals wherein selected ones of said first and second enable signals are not inhibited by the presence of delayed first and second enable signals.

* * * * *